United States Patent
Fehringer et al.

(10) Patent No.: US 7,055,459 B2
(45) Date of Patent: Jun. 6, 2006

(54) ANIMAL FEED DISPENSER

(76) Inventors: Ed Fehringer, 11296 N. Eastshore Dr., Hayden, ID (US) 83835; Dan Fehringer, 907 E. Lochmaree, Hayden, ID (US) 83835

( * ) Notice: Subject to any disclaimer, the term of this patent is extended or adjusted under 35 U.S.C. 154(b) by 0 days.

(21) Appl. No.: 10/878,184

(22) Filed: Jun. 28, 2004

(65) Prior Publication Data

US 2005/0284383 A1    Dec. 29, 2005

(51) Int. Cl.
*A01K 1/10* (2006.01)
*A01K 5/02* (2006.01)

(52) U.S. Cl. .................... 119/54; 119/51.13

(58) Field of Classification Search ............ 119/52.1, 119/54, 55, 56.1, 56.2, 57, 51.13
See application file for complete search history.

(56) References Cited

U.S. PATENT DOCUMENTS

| | | | |
|---|---|---|---|
| 1,442,382 A | | 1/1923 | Bullock |
| 1,595,758 A | * | 8/1926 | Collins ............... 119/54 |
| 2,585,371 A | | 2/1952 | Coffing |
| 2,687,114 A | * | 8/1954 | Tuddenham ............ 119/54 |
| 3,473,696 A | | 10/1969 | Morris |
| 3,683,859 A | | 8/1972 | Kirk |
| 3,685,689 A | | 8/1972 | Borner et al. |
| 3,752,358 A | | 8/1973 | Phno |
| 3,884,189 A | | 5/1975 | Ruth |
| 5,345,893 A | | 9/1994 | Morris |
| 5,447,120 A | | 9/1995 | Eberhardt |
| 5,520,143 A | | 5/1996 | Duin |
| 5,970,912 A | | 10/1999 | Supple et al. |
| 6,055,933 A | | 5/2000 | Lyden |
| 6,405,674 B1 | | 6/2002 | Majewski et al. |
| 6,557,490 B1 | * | 5/2003 | Vaughn ............... 119/56.1 |
| 6,715,443 B1 | | 4/2004 | Bernard |
| 6,729,890 B1 | * | 5/2004 | Shin ..................... 439/74 |
| 2003/0168015 A1 | | 9/2003 | Vaughn |

FOREIGN PATENT DOCUMENTS

GB    2310994    9/1997

\* cited by examiner

*Primary Examiner*—Michael J. Carone
*Assistant Examiner*—Bret Hayes
(74) *Attorney, Agent, or Firm*—Reidlaw, L.L.C.; John S. Reid

(57) ABSTRACT

An animal feed dispenser is disclosed with a cabinet mounted feed support shelf pivots between a feed support and discharge positions. A release member can engage and disengage the feed support shelf to hold the feed support shelf in the feed support position and release the shelf to move to the feed discharge position. A frame mounts the shelf for movement between a substantially horizontal feed loading position and a substantially upright operative position. The shelves can be pivoted up from the feed discharge positions during loading with the frame in the feed loading position. In another aspect, plural shelves are mounted within the cabinet in an elevational array and are supported one against another until release members move to allow movement of each to the feed discharge position. A further aspect includes a manger that can be selectively mounted to the cabinet to face different directions.

16 Claims, 12 Drawing Sheets

ANIMAL FEED DISPENSER

FIELD OF THE INVENTION

The invention claimed and disclosed herein pertains generally to apparatus for feeding animals and more particularly to feeders that dispense animal feed.

BACKGROUND

Many domestic animals, such as horses, require feeding at fairly regular intervals. However in many instances, feed cannot be simply left in bulk because the animals would either overfeed, or eat selectively and allow portions of the feed to spoil. Also many animal owners cannot take time to perform periodic feedings.

To solve the above problems, feed dispensers have been developed that will discharge feed at specified timed intervals. However many such feeders are complex, difficult to load, or unreliable.

SUMMARY

One aspect of the present invention provides for an animal feed dispenser that includes a cabinet with a feed support shelf movable about a pivot axis within the cabinet between a feed support position and a feed discharge position. A release member is positionable to operably engage and disengage the feed support shelf to respectively hold the feed support shelf in the feed support position and release the feed support shelf to move to the feed discharge position. A frame mounts the feed support shelf to the cabinet for movement between a substantially horizontal feed loading position and a substantially upright operative position.

In another aspect, an animal feed dispenser includes an upright cabinet having a feed discharge at a bottom end. Shelves in an upright array are hinged within in the cabinet and each shelf can pivot from a substantially horizontal feed support position to a substantially vertical feed discharge position. Each of the shelves includes a hinged brace that can swing from an operative bracing position, supporting the associated shelf in the feed support position, to a free position depending from the associated shelf in the feed discharge position. A release member is mounted below each shelf in the feed support position, and is movable between an operative brace receiving position, to receive and support the brace of a shelf above, and a disengage position to disengage the brace to allow the shelf above to move to the feed discharge position. The shelves and release members are disposed in a spatial relationship such that each brace and associated shelf that are situated above the bottom shelf will rest against a shelf below, and as the shelf below moves to the feed discharge position, the brace of the shelf immediately above will engage and become supported on an adjacent one of the release members until the adjacent one of the release members moves to the disengage position.

A further aspect of an animal feed dispenser in accordance with the present invention includes a cabinet with an at least partially enclosed interior leading to a feed discharge. A feed support shelf is movable within the cabinet between a feed support position and a feed discharge position, and is configured to drop feed through the feed discharge to a manger attached to the cabinet at the feed discharge. The manger and cabinet are configured to permit selective mounting of the manger to the cabinet in any one of multiple directional orientations.

Another aspect animal feed dispenser in accordance with the present invention includes a cabinet with a frame mounted on the cabinet for pivotal movement between a substantially upright operative position and a substantially horizontal feed loading position. A plurality of feed support shelves are mounted on the frame about shelf pivot axes between feed support positions and feed discharge positions. The feed support shelves are substantially horizontal in the feed support positions and are pivotable to substantially vertical orientations in the feed release positions when the frame is in the upright operative position. The feed support shelves are substantially horizontal in the feed release positions and are pivotable to substantially vertical orientations in the feed support positions when the frame is in the substantially horizontal feed loading position. Release members are configured to operably engage and disengage the feed support shelves to release the feed support shelves to move to the feed discharge positions.

The above, and further aspects and embodiments, will next be described in detail with reference to the accompanying drawings which, taken along with the following detailed description and claims, disclose the best mode presently known for carrying out the invention.

DETAILED DESCRIPTION

Figure 1:
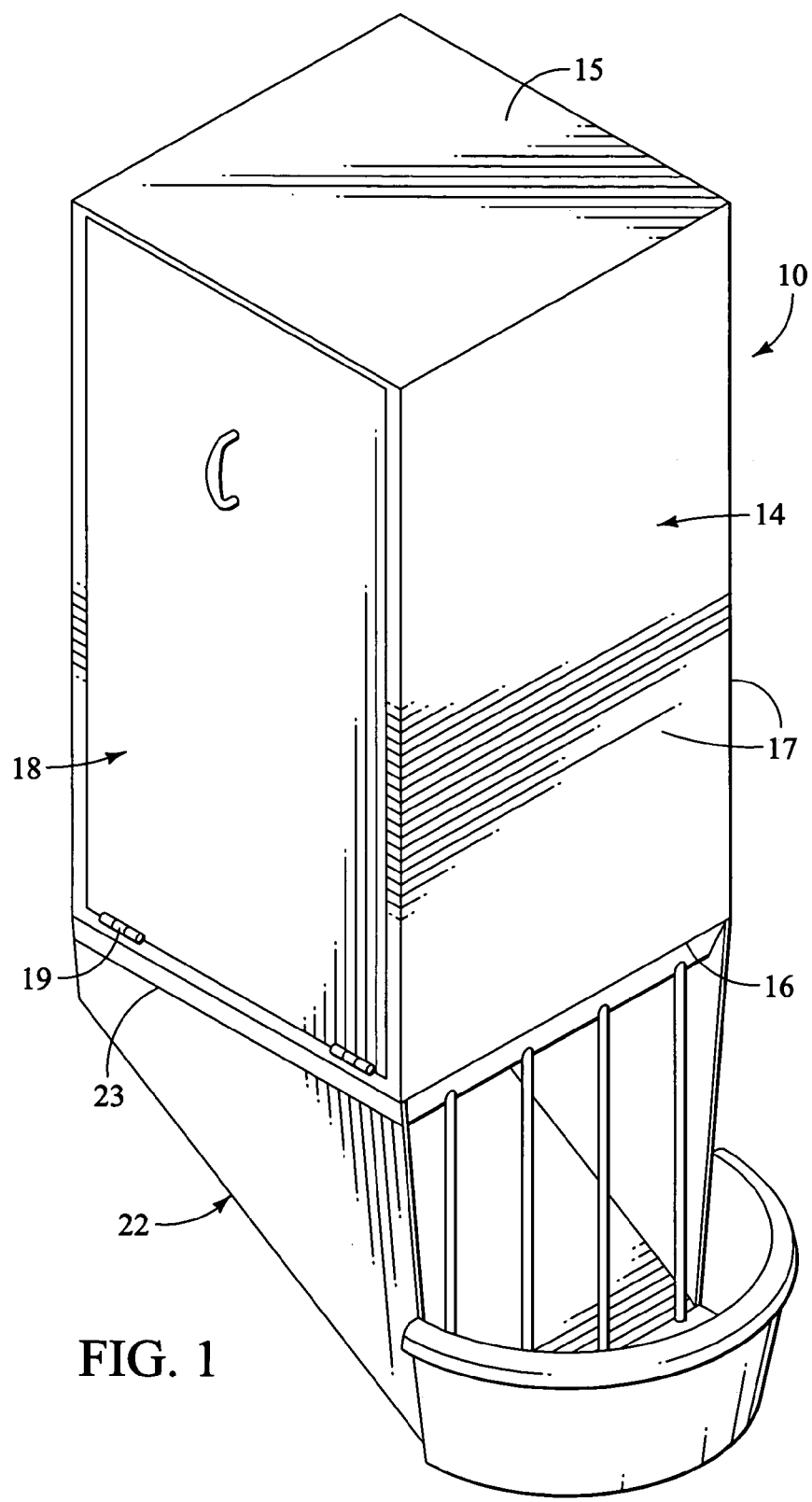
FIG. 1 is a perspective view of an embodiment of the present animal feed dispenser.

Embodiments of the present invention are exemplified in the drawings and will be described using reference numerals to identify various elements and features. Identical or similar elements or features will bear the same reference numerals, and for brevity, description of one element or feature can be understood as describing all other similar or identical elements or features.

Figure 2:
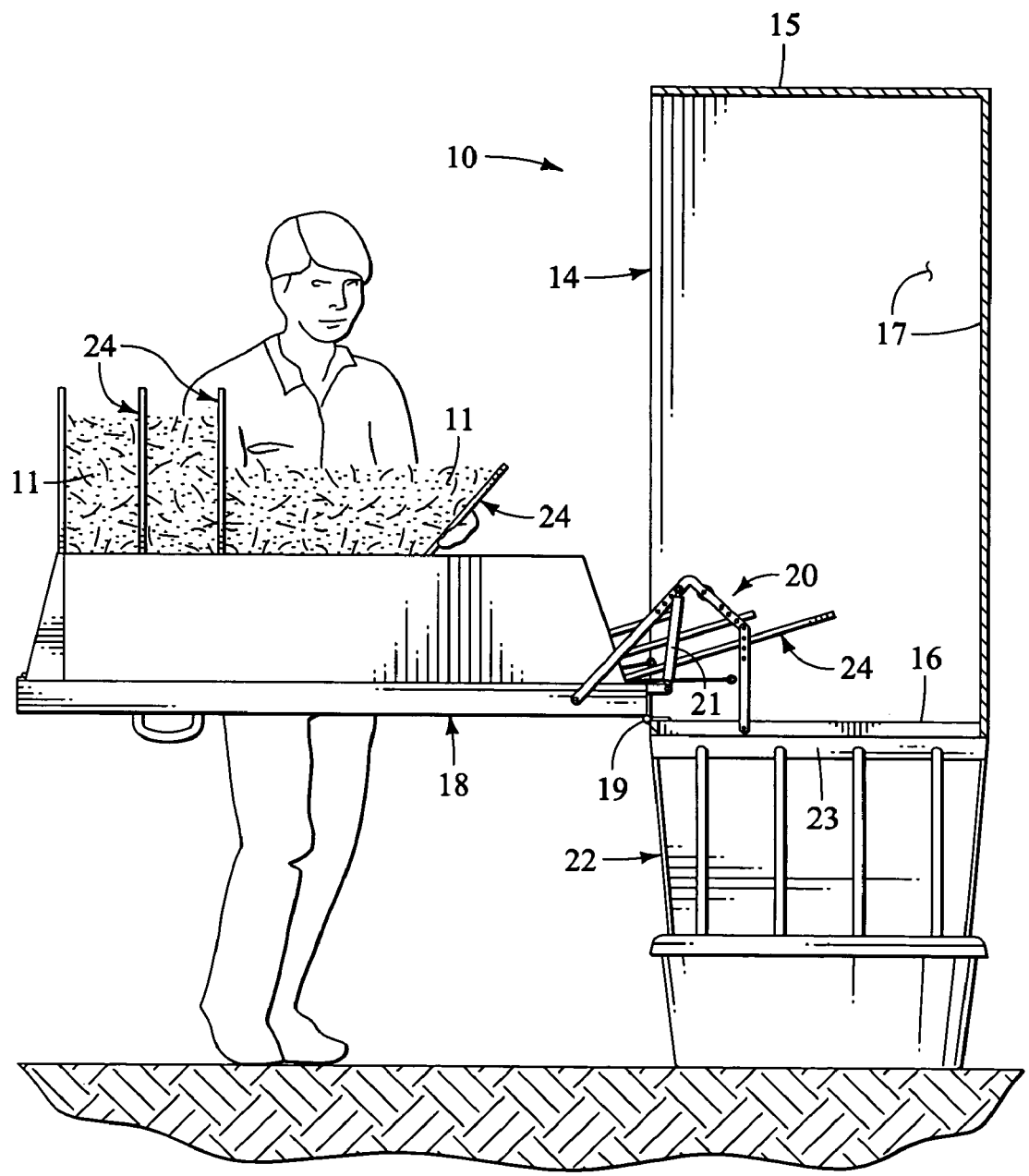
FIG. 2 is a partially sectioned view of the dispenser in a condition where feed can be loaded between adjacent feed support shelves.
Figure 3:
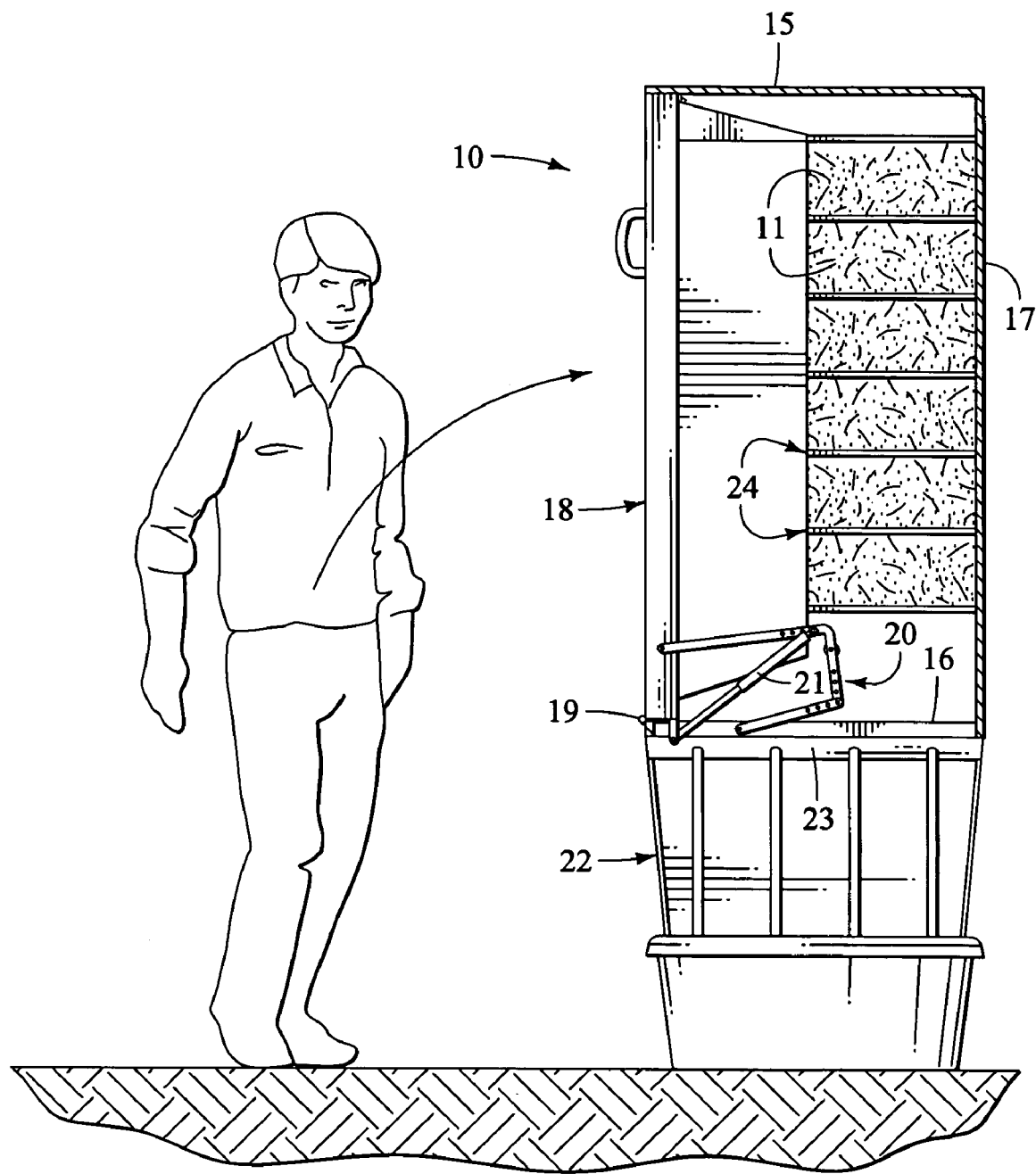
FIG. 3 is a partially sectioned view showing the animal feed dispenser in a fully loaded condition.
Figure 4:
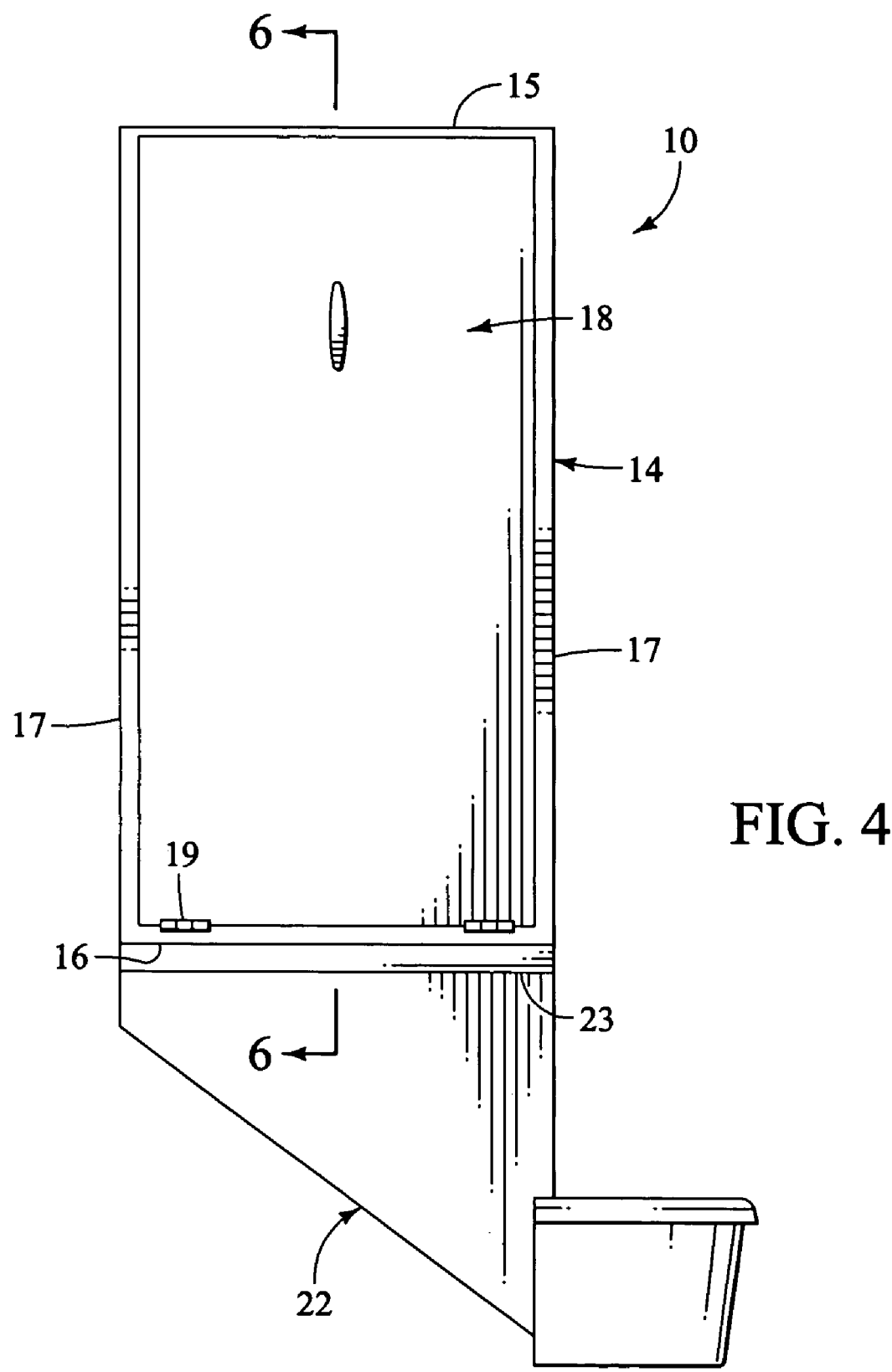
FIG. 4 is a side elevation view as seen from the left in FIG. 1.

Forms of the present animal feeder, which is generally identified by reference numeral 10, are provided for dispensing animal feed which is not shown in all views for clarity purposes, but is shown schematically in FIGS. 2 and 3 as item 11. The feeder 10 can be constructed to receive individual charges of feed 11 (such as flake hay from a hay bale), and to dispense the individual charges at timed intervals. Various forms of non-liquid feed 11 can be used. Alfalfa is one form of feed that can be used effectively in the feeder 10.

Looking now to the drawings in greater detail, with attention first drawn to FIGS. 1 and 2, the embodiment depicted therein includes a substantially upright cabinet 14 that can be mounted to a wall, fence, tree, or any other appropriate upright support structure. The cabinet 14 can also be made in various configurations. For example, the cabinet 14 as a basic form of support can simply be a part of a wall or floor, or can be constructed as a self contained, supported unit.

The cabinet 14 can be formed of appropriate structural material. In the self contained example illustrated, the depicted cabinet can be formed of sheet metal, and be of an appropriate shape and size according to the size and feeding needs for the animal to be fed. In the illustrated example, the cabinet 14 is formed in a substantially rectangular configuration for ease of construction. Other shapes can be used as well.

The cabinet 14 depicted in the drawings extends from a top end 15, which can be closed, to a bottom discharge 16. Sidewalls 17 can be provided to extend between the two extremities. In illustrated examples, the walls 17 span three sides of the rectangular cabinet configuration, with a remaining side spanned by a door panel covered frame 18 that can be pivotably mounted by appropriate structure, such as hinges 19, to the cabinet 14.

The hinges 19 can allow the frame 18 to move between an upright operative position shown in FIG. 1, and a substantially horizontal feed loading position as depicted by FIG. 2. In the illustrated forms, the hinges 19 are situated toward the bottom of the cabinet 14 and are arranged along a substantially horizontal frame pivot axis at the discharge end of the cabinet 14.

In the example shown by FIG. 2, the cabinet 14 can be positioned so that the frame 18 can be lowered to a feed loading position that is at approximate waist height. Such positioning is enabled by the location of hinges 19, and by providing the feed support shelves 24 on the frame 18.

The frame 18 can be made to carry the feed support shelves 24, drive components, and the weight of several charges of feed 11. The frame 18 can therefore be fairly heavy, especially when full of feed. To reduce shock loading, a damper and assist linkage 20, with a conventional form of damper spring cylinder 21 (FIGS. 2, 3), can be mounted between the frame 18 and cabinet 14 to assist the user in moving the frame 18 between the illustrated positions (FIGS. 1 and 2). It should be understood that the illustrated linkage 20 is exemplary only, and that other forms of spring assist and damping can also be used. It is also possible to use a conventional mechanized door opener arrangement (not illustrated) to provide powered movement to frame 18 and attached components.

Figure 5A:
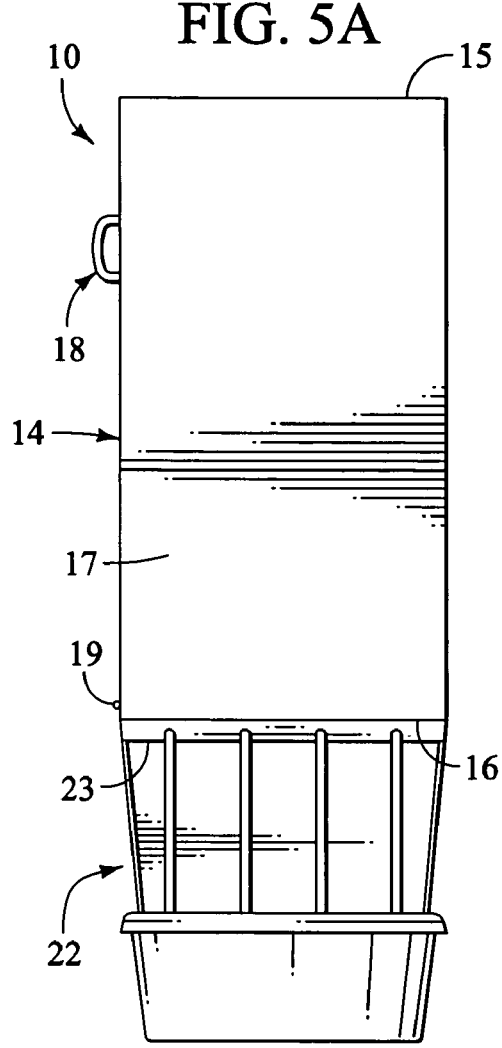
FIGS. 5a and 5b are views showing different mounted orientations of a manger connected to the animal feed dispenser of FIG. 1.
Figure 5B:
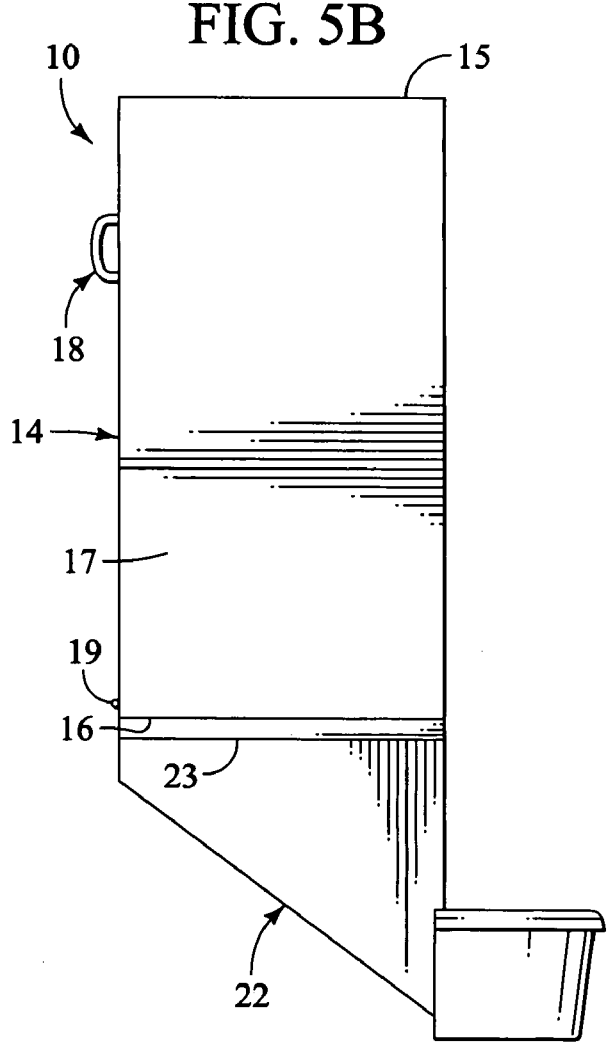

Various drawing figures exemplify a manger 22 that can be a permanent or integral part of the cabinet 14, or that, as illustrated, can be configured to be secured to the cabinet 14. The illustrated manger 22 can be mounted at the cabinet discharge 16 to receive feed 11 from above, and to present the feed to an animal for consumption. FIGS. 5A and 5B are included to illustrate forms of the present feed dispenser 10 in which the manger 22 and cabinet 14 are configured to permit mounting of the manger 22 to face in a selected direction.

Adjustment of the manger 22 can be beneficial in situations where animal access to the manger 22, and human access to the frame 18, is limited by adjacent structure. In the example illustrated in FIGS. 1, 2, and 5A the manger 22 faces the viewer, and the frame 18 is to the left hand side of the figure. In the example illustrated in FIG. 5B, the manger 22 is located on the right side of the cabinet 14, and the frame 18 is on the left.

The above adjustment capability can be enabled in forms of the present feed dispenser 10 by separately manufacturing the manger 22 and by making a mounting end 23 of the manger complimentary to the discharge 16 of the cabinet. Either or both of the discharge 16 or the mounting end 23 of the manger 22 can be interconnected using conventional fasteners (not shown).

By way of example, a square shaped discharge 16, and a similarly square shaped mounting end 23 of the manger 22, can enable positioning of the manger 22 in any of four different orientations. Other arrangements that are not illustrated can make use of different polygonal or circular configurations that lend themselves to other alternative positioning of the manger 22.

Looking now in greater detail at FIGS. 6, 7, 9, and 10, exemplary feed support shelves 24 are depicted. Illustrated aspects of the invention show multiple shelves 24 arranged in an upright array (FIGS. 3, 6, 7) within the upright oriented cabinet 14. It is pointed out that the illustrated arrangements are exemplary only and it should be understood that more or fewer of the shelves 24 can be used.

It should also be noted that the "upright" orientation of the cabinet 14 and array of shelves 24 is not to be understood as being strictly vertical, since some variation in angularity is tolerable so long as the dispensing function of the present feed dispenser 10 is not affected. Likewise, the term "horizontal" as used herein should also be understood in a general non-precision sense.

Figure 9:
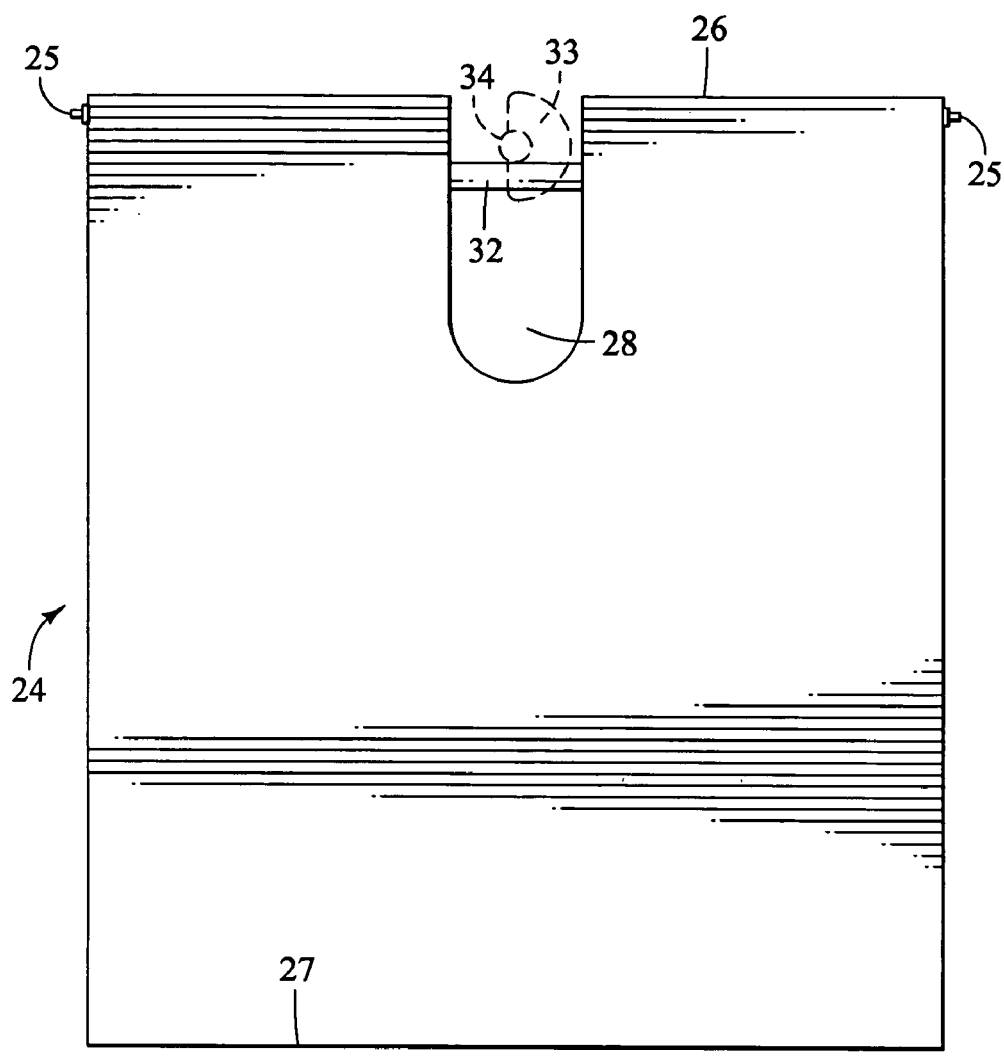
FIG. 9 is a top plan view of a typical feed support shelf, with an associated release member shown in dashed lines.
Figure 10:
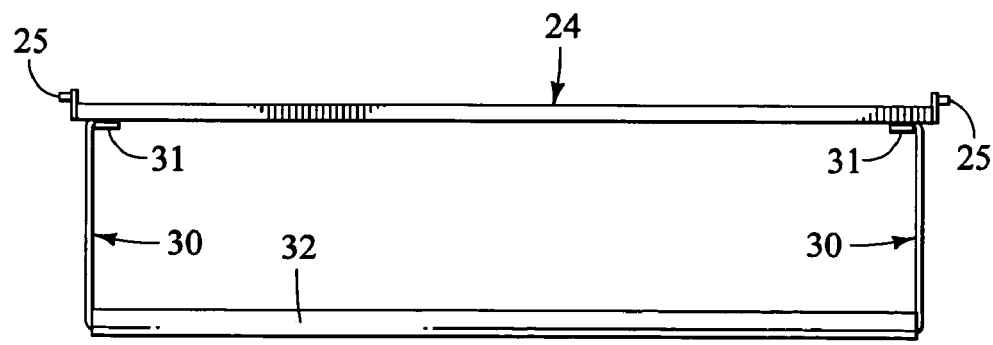
FIG. 10 is an end view of the feed support shelf exemplified in FIG. 9.

Attention is drawn now to FIGS. 9 and 10 wherein a single feed support shelf 24 is exemplified. This configuration can be typical where multiple shelves are to be used, so description of the singular shelf structure can be understood to be inclusive of all illustrated shelves.

The depicted shelf 24 is of a generally rectangular shape, complimentary to the cabinet interior. Materials used for shelf construction can vary and include metals, plastics or other appropriate substantially rigid materials that can be finished with a low friction coefficient to allow feed 11 to slide freely therefrom.

Figure 12:
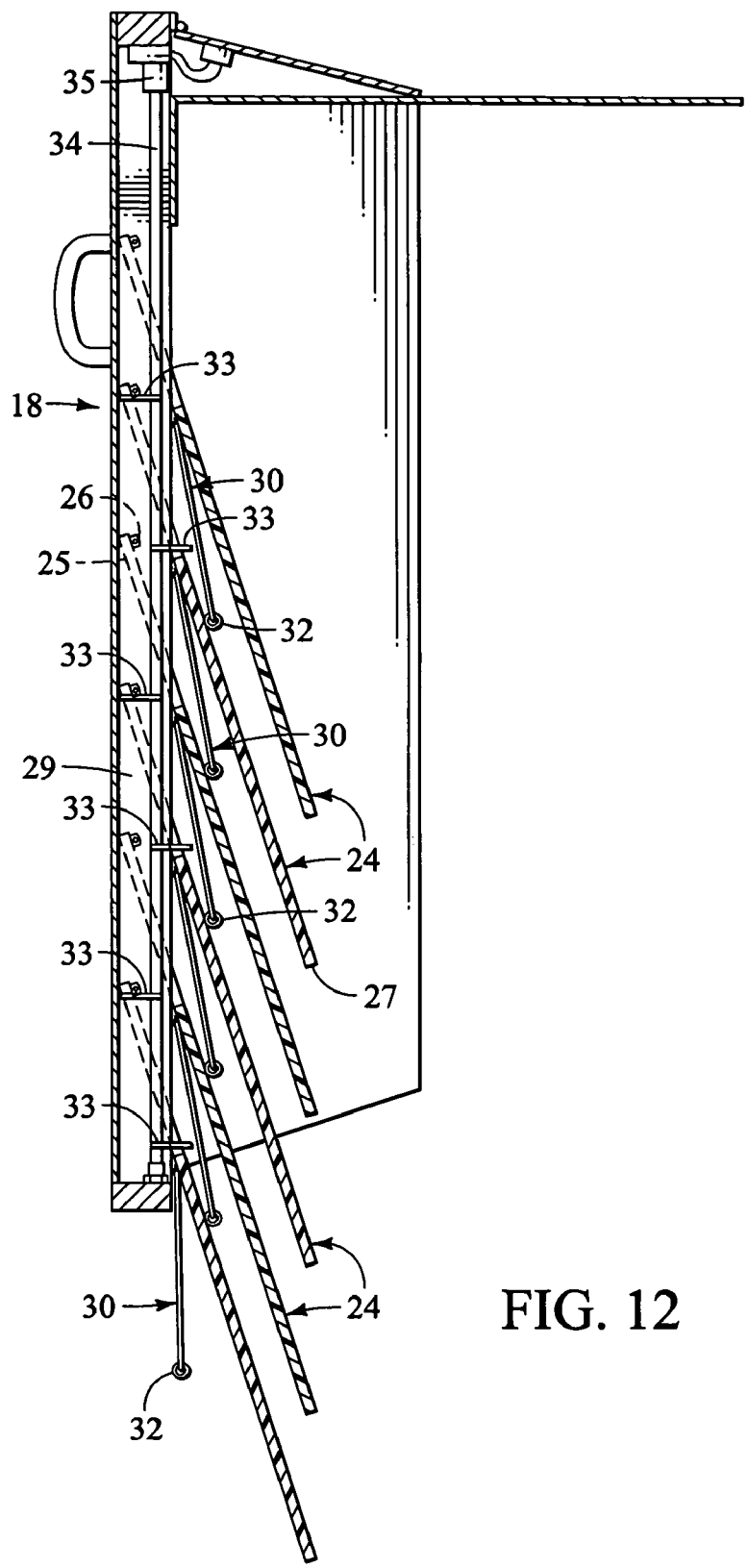
FIG. 12 is a view similar to FIG. 11 only showing all shelves in their discharge positions.

Hinge pins 25 are depicted as an example of a manner by which the shelves 24 can be movable between substantially horizontal feed supporting positions (see FIG. 3 where all the shelves 24 are illustrated in the feed supporting positions) and feed discharge positions (see FIG. 12 where all the shelves 24 are illustrated in the feed discharge positions).

In illustrated aspects of the invention, the shelves 24 are mounted to the frame 18 for movement between the feed loading position (FIG. 2) and an upright operative position (FIG. 3). Mounting the shelves to the cabinet in this manner facilitates loading of feed. It is understood, however, other mounting arrangements can be used. For example, the shelves 24 can be mounted with the shelf hinge axes in fixed relation within the cabinet 14, in such a manner that the shelves 24 remain in their substantial upright array and are loaded from an open side.

Figure 6:
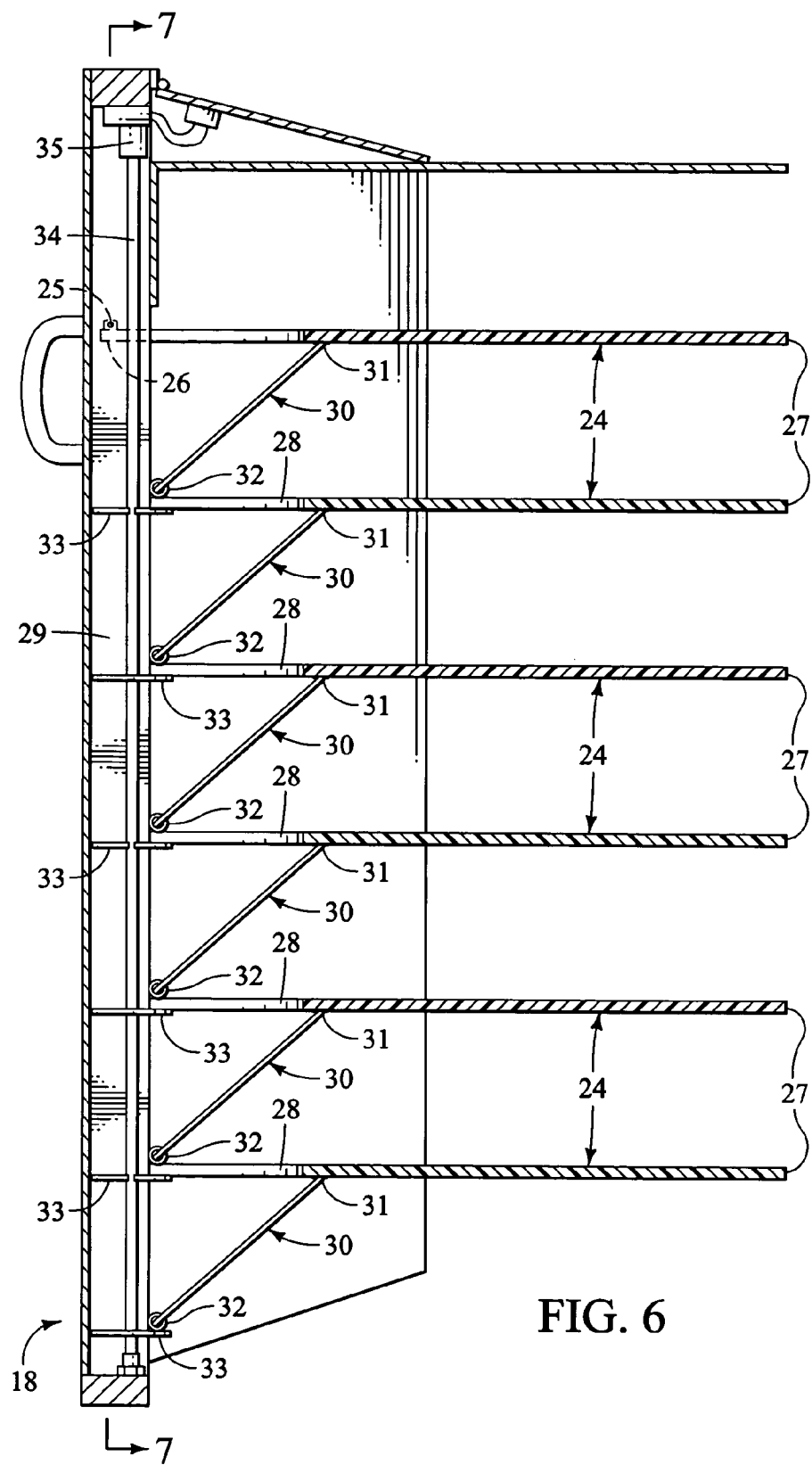
FIG. 6 is an enlarged sectional view taken substantially along line 6—6 in FIG. 4.

In the illustrated examples, each shelf 24 can include hinge pins 25 that are situated toward a back shelf edge 26. A forward shelf edge 27 can be formed along a side of the shelf 24 opposite to the back edge 26, as part of a perimeter that can be made to compliment the interior shape of the cabinet. The back edge 26 can be broken by a recess 28 that can be formed into the shelf to accommodate a release member 33 which will be described in greater detail below. The recesses 28 are shown by FIG. 6 and others to be substantially centered on an elongated channel 29 of the frame 18.

An exemplary form of feed supporting shelf 24 can include a brace 30. In the illustrated forms, the brace 30 can be provided as part of each shelf 24, for movement between (a) a load bracing position (see FIG. 6, 7 and others) in association with the feed support position of the shelf 24 and in which the brace 30 extends from the feed support shelf 24 to structurally support the feed support shelf 24 in the feed support position, and (b) an unbraced free position (see FIG. 12 and others) in association with the feed discharge position and in which the associated feed support shelf 24 is unsupported by the brace 30.

Figure 7:
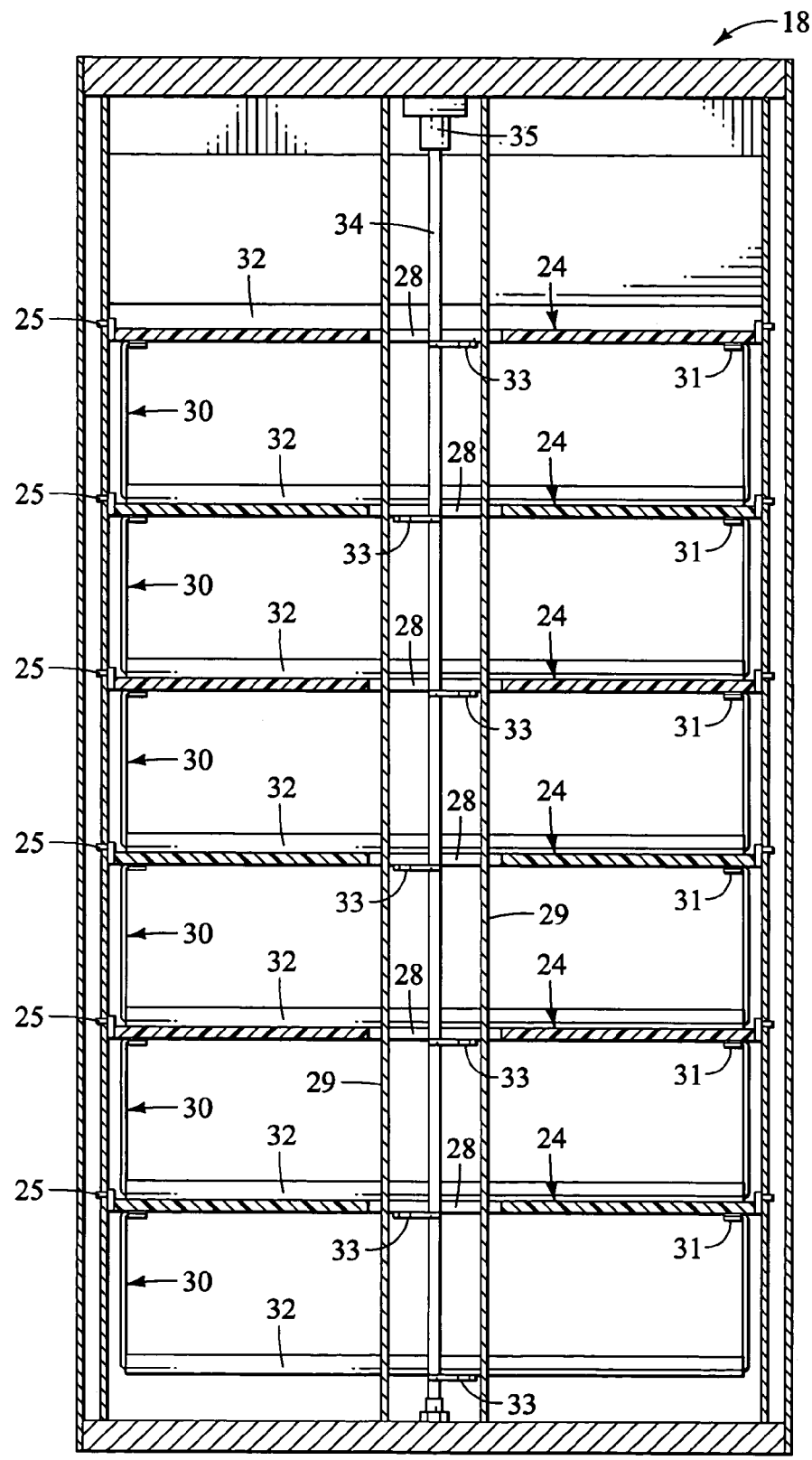
FIG. 7 is a sectional view taken substantially along line 7—7 in FIG. 6.

The brace 30 can be mounted at hinge points 31 to the associated shelf 24 and span the shelf width. Also, the brace 30 can be formed as illustrated, from an elongated rod, bent into a substantially "u" shape as illustrated in FIG. 7 to avoid obstruction of the space between the associated shelf 24 and the next shelf 24 below. A cross bar 32 can be disposed along the brace 30 for rolling, low friction resting engagement with the channel 29 and the shelf 24 below (when the shelves are in the horizontal feed supporting positions). The cross bar 32 also slides or rolls over the engaged shelf 24 and shifts onto the adjacent release member 33 when the shelf below swings down to the feed discharge position (compare FIGS. 13 and 14). The cross bar 32 is also braced against the channel 29 when resting on the associated release member 33.

The above may be said for all braces 30 with the exception of the brace 30 on the bottom-most shelf 24. Because there is no shelf below the bottom-most shelf 24, the bottom brace 30 either braces and supports the associated bottom shelf 24 in its horizontal feed support position (FIG. 6) against the associated bottom release member 33 and channel 29, or hangs loosely from bottom-most shelf 24 (FIG. 11) when the shelf is in the feed discharge position.

It is noted that the hinge axes for the brace hinge points 31 and the axes defined by the hinge pins 25 for the shelves 24 can be substantially horizontal and parallel to one another. Such substantial parallel relationships simplify construction and allow the shelves 24 and braces 30 to move relatively freely by gravity and without interference.

The shelves 24 can be made to drop from the feed support positions shown in FIGS. 3 and 6, to feed discharge positions (FIG. 12) by provision of a release arrangement, as alluded to above. In general, a shelf release function can be accomplished by a device that initially holds an associated shelf 24 in the feed support orientation, and which can be operated to disengage the shelf and allow it to swing down to its feed discharge position.

Figure 8:
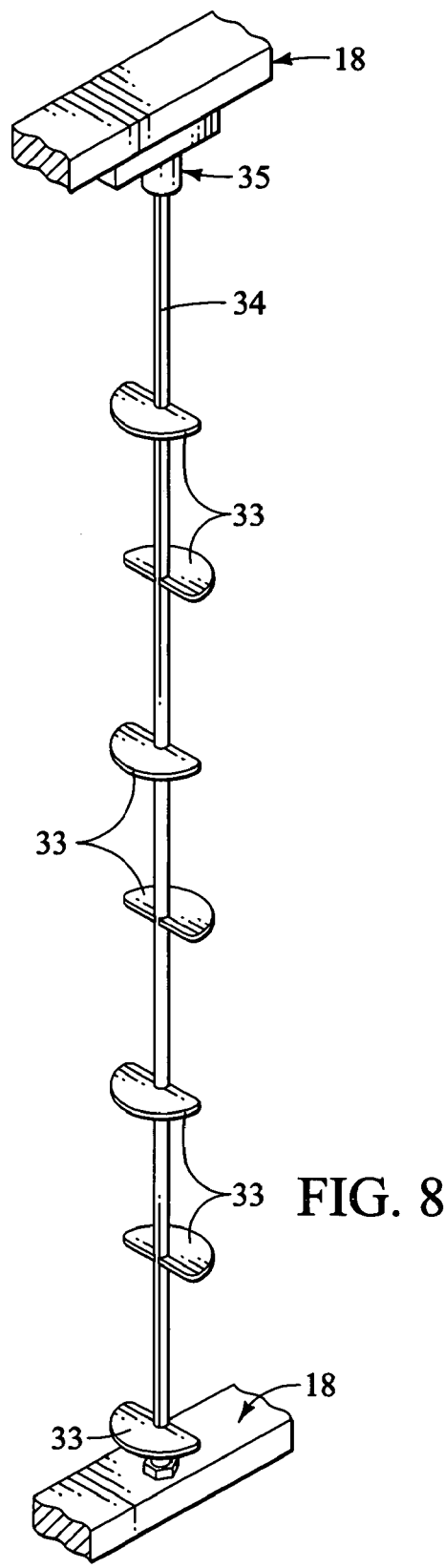
FIG. 8 is a perspective detail view of release members and an exemplary driver.

FIG. 8 illustrates exemplary release members 33 that are simple in construction, reliable, and that can be used to accomplish the release function in a succession so that the array of shelves 24 can progressively drop their loads of feed to the manger 22 below. Alternative apparatus, such as solenoids, latches, cylinders, servos, or the like (not shown), can also be made to accomplish this function.

In illustrated embodiments, the release members 33 are mounted in spaced relation along a shaft 34 for rotation into and away from supporting engagement with the shelves 24 (by way of their associated braces 30). The shaft 34 can be rotatably mounted to the frame 18 within the elongated channel 29 (FIGS. 13, 14) in such a manner that the channel will protect the shaft against engagement by the cross bars 32. Rotation of the shaft is thus unhampered by frictional contact from the braces.

Figure 13:
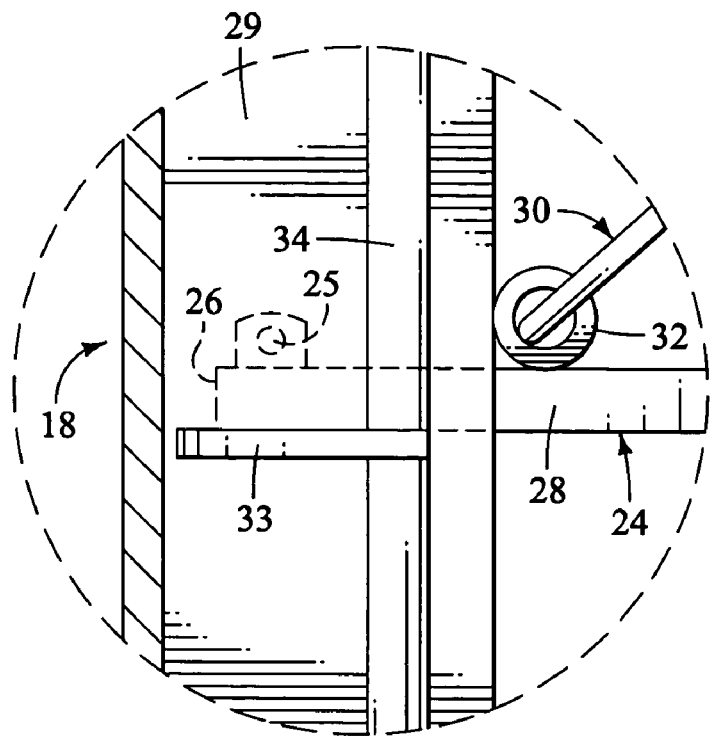
FIG. 13 is an enlarged detail view of an area identified at 13 in FIG. 11.
Figure 14:
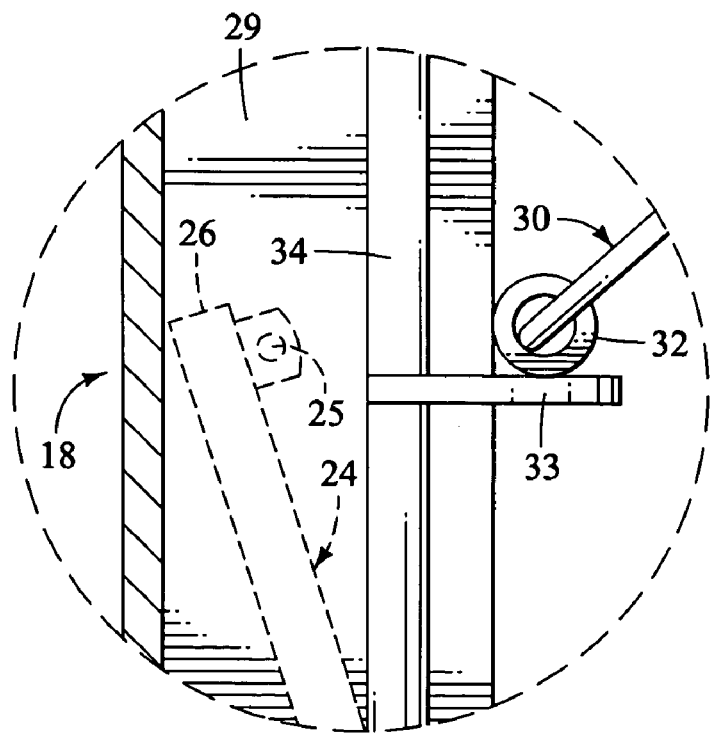
FIG. 14 is an enlarged detail view of an area identified at 14 in FIG. 11.

The illustrated release members 33 can be formed of metal plates that can be welded or otherwise attached to the shaft 34 at locations just below the associated shelves (when in their feed support positions) as shown in FIGS. 6, 13 and 14. The release members 33 can be shaped (FIG. 9, dashed lines) so as to pass through the shelf recesses 28 when the shelves 24 move between their feed supporting and dispensing positions.

The shaft 34 can be mounted to the frame 18 for rotation about an axis that can be substantially perpendicular to the shelf pivot axes. Also, the shaft 34 can be spaced slightly toward the forward shelf edges 27 from the back edges 26 and pivot pins 25. As suggested by FIG. 9, the shaft 34 can also pass without interference through the recesses 28 of the shelves 24, and situate the release members 33 in positions to sequentially engage and release the shelves 24 by way of their associated braces 30.

The release members 33 can be spaced angularly about the shaft 34 so that rotation of the shaft 34 will move the members 33 into and away from engagement with the shelves 24 (by way of the braces 30). FIG. 8 shows an example in which successive release members 33 are spaced apart angularly about the shaft 34 in 180 degree increments, so as to alternately engage and disengage the shelves 24 and release members 33 as the shaft 34 rotates, to thereby progressively release the shelves to drop to the folded discharge positions.

FIGS. 6–9 show the shaft 34 and release members 33 in their starting and ending support positions. That is to say, the members 33 can be rotated from the shelf supporting positions most clearly shown in FIG. 8, through an angle of 180 degrees to an ending support position. FIGS. 11–14 show intermediate or partially rotated positions of the members 33.

A driver 35 can be mounted to the frame 18, and connected to the shaft 34, to selectively rotate the shaft and the release members 33. The driver can be provided in the form of a self-contained conventional electric motor, powered by a conventional battery or other source of electrical energy. Where standard electrical power is unavailable or inconvenient, a conventional solar cell charging system can be used. The driver 35 can be timed by conventional timing arrangements (not shown) to operate at selected intervals to rotate the shaft 34 in 180 degree increments so the shelves 24 can progressively drop feed 11 to the manger 22 below.

Figure 11:
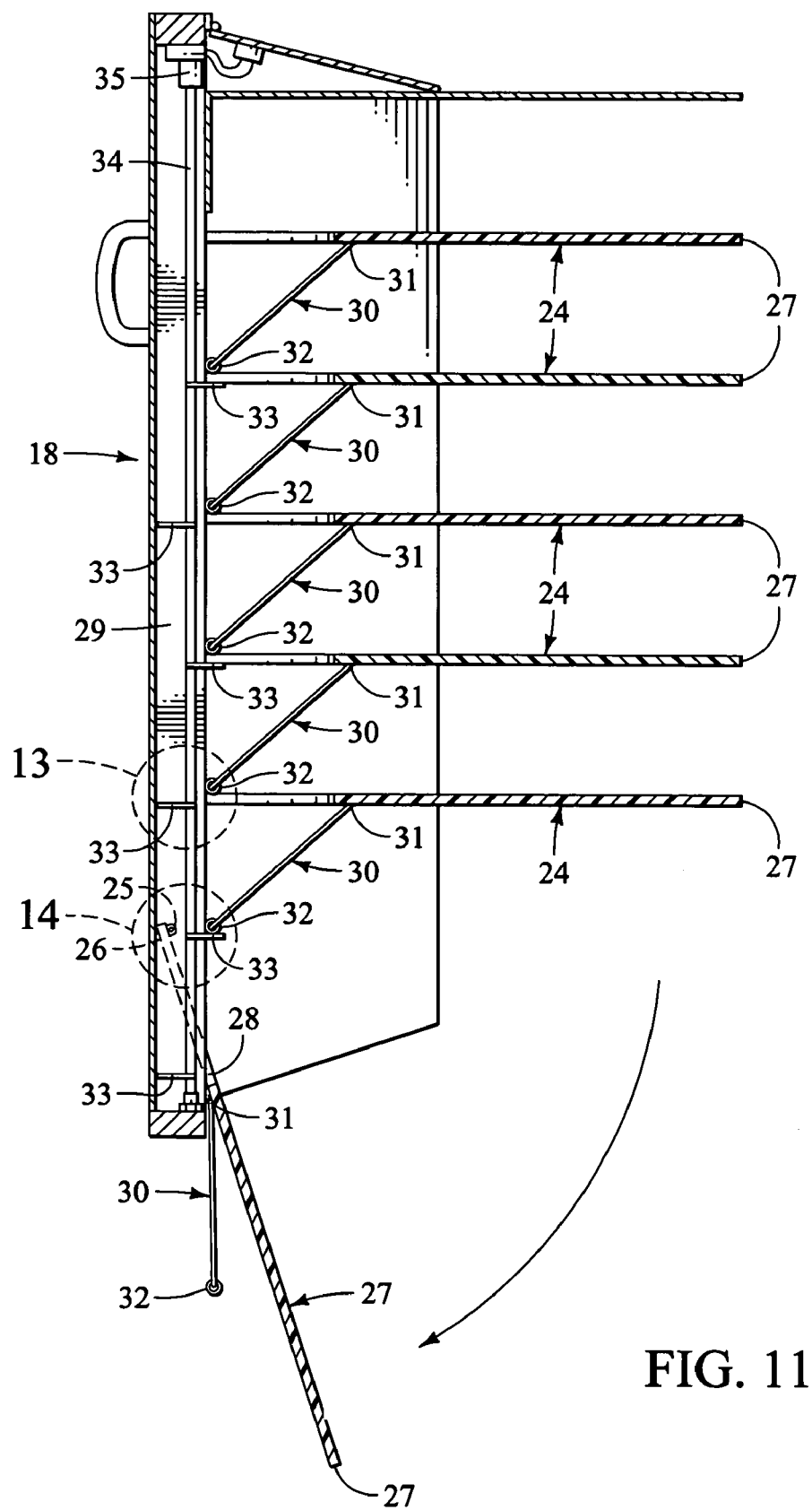
FIG. 11 is a view similar to that shown in FIG. 6 only showing a bottom feed support shelf in a discharge position.

During the 180 degree rotation, each alternate release member will move from a support position, to a release position, and back to a support position. The release positions occur after approximately 90 degrees of shaft rotation, as shown in FIGS. 11 and 12. The release members 33 can be staggered angularly along the shaft 34, so that when the shaft rotates to 90 degrees from the FIG. 8 starting position, one member 33 will be in a release position, and the next adjacent member will be in a support position (see FIGS. 11–14).

Timed rotation of the shaft 34 (in 180 degree increments) and placement of the release members 33 can be arranged so that the bottom-most shelf 24 will first drop its feed charge to the manger 22. Then, after an elapsed time the shaft will rotate again and the next shelf will drop its feed charge, and so on until the top shelf drops its feed charge and the feed dispenser 10 is empty. This sequence is a function of movement of the release members 33, and the spatial arrangement of the release members 33 to the shaft 34, the braces 30, and the shelves 24.

It is noted that the spatial arrangement of elements described thus far and depicted in the drawings can be such that only the brace 30 of the bottom-most unreleased shelf 24 will be borne against a single associated release member 33 and the adjacent part of the channel 29. By this provision, power requirements for the driver 35 to rotate the shaft 34 can be significantly lower than what would be required if all the braces 30 were to bear against the shaft 34 and all the release members 33 at once.

The relationship referred to above may best be understood by referring to FIGS. 13, 14, and 11. First, the reader is directed to FIG. 11 where the areas identified by circles labeled 13 and 14 refer respectively to the enlarged detail views of FIG. 13 and FIG. 14.

Referring to FIG. 13, we see what can be considered any one of the shelves 24 that is in the feed supporting position and that is located above the "current" bottom-most shelf (which in FIG. 11 is the next one up from the shelf 24 shown in the feed discharge position). It can be seen in FIG. 13 (with reference to FIG. 11 for environment) that the brace 30 from the next shelf up is thrust against the channel 29 and is resting on the shelf below, and not the associated release member 33. This is also true of the remaining shelves 24 above the "current" bottom shelf, as can be understood by examining FIG. 11. Thus the shelves 24 and channel 19 themselves carry the braces 30 and shelves 24 that are situated above the current bottom-most shelf 24. Further, all the release members 33 but one (FIG. 14) are free from engagement with associated braces 30.

The only frictional resistance to rotation encountered by a release member 33 is that produced by engagement with the associated brace 30 from the current bottom-most shelf, as shown by FIG. 11. This is because the previous bottom-most shelf 24 is now in its feed discharge position (dashed lines in FIG. 14) and the brace 30 from the shelf 24 above (which has now become the "current" bottom-most shelf) is now borne by the associated release member 33 (FIG. 14). The brace 30 was transferred from the shelf 24 to the adjacent release member 33 (and remains thrust against channel 29) as the shelf 24 pivoted downward to the discharge position.

Operation of the present animal feed dispenser follows assembly in which the cabinet 14 is secured to an appropriate support. The manger 22 can be attached at this time, facing in a desired direction with respect to the frame 18 and shelves 24.

An operational cycle can begin with loading the various shelves with feed. To begin charging the device with feed, the user can first pull the frame 18, assisted by the damping linkage 20, downwardly from the upright operative position (FIG. 1) to the feed loading position (FIG. 2). The user will find the empty shelves 24 in the folded discharge positions. Starting at the top end of the frame, the user can first place a charge of feed onto the top-most shelf 24, then swing that shelf up to its feed support position. The brace 30 on that shelf will ride over and become seated against an adjacent one of the release members 33 (which are all in support positions) and channel 29, securing the shelf in position the feed support position. Now the user can move on to the next shelf and repeat the loading step, by placing another charge on the next shelf 24, followed by lifting that shelf to its feed support position. These steps can be repeated for each of the shelves until the feeder is full.

It is pointed out that by initially leaving the shelves in the folded discharge positions so they are substantially horizontal when the frame is pulled down, the user is not required to stuff feed between adjacent pairs of shelves, as would be required if the shelves were presented in the feed supporting positions shown in FIG. 6. Instead, the previously emptied shelves 24 are presented to the user in their discharge positions substantially as shown in FIG. 12, (except that the frame 18 and shelves 24 have been pivoted down to the loading position shown in FIG. 2). With this arrangement, the user can simply place a charge of feed onto a shelf (which is presently substantially horizontal), and then pivot that shelf up into its feed support position. The initial feed area is quite large, by reason of the shelf being horizontal, so the user need not take extraordinary care in the feed placement. By this provision, the user can easily place feed on a presently horizontal shelf 24, and, by lifting the shelf 24 to its feed support position, capture and possibly even compress the feed charge as the shelf reaches its feed support position.

It is also noted with reference to FIG. 2, that loading all the shelves with feed can be accomplished at a single convenient elevation. To complete the loading operation, all the user is required to do is load feed onto, then lift the successive shelves 24 as pages in a book with the feed sandwiched between successive shelves, all at substantially the same elevation. Although the working elevation of the frame can vary with the mounted elevation of the dispenser 10, a useful elevation is about waist high as shown in FIG. 2.

Once the desired amount of feed 11 has been loaded, the user can swing the frame 18 back upwardly to move the shelves 24 and feed into the cabinet and into position to begin feeding. At this time the user may initiate operation of the timed drive 35 by appropriate switching (not shown), to start an interval of time to the first feeding.

Once the feed time interval has run, the drive 35 is activated, and rotates the shelf 24 rides on the bottom release member 33 until the release member 33 rotates from engagement (about 90 degrees into the 180 degree rotation cycle) and the shelf 24 is allowed to drop. As this happens, feed held on the bottom-most shelf 24 drops into the manger, thus completing the first feeding. Completion of the 180 degree rotation brings the release members 33 back once again to the support positions.

As the bottom-most shelf 24 swings down, the brace 30 from the next shelf up is lowered onto the next successive release member 33 up the shaft 34. The channel 29 will also bear forces produced by the brace and the weight above. Then, after another time interval, the driver 35 can again rotate the shaft 34 another 180 degrees, causing the release members 33, and particularly the presently bottom most release member 33 to rotate from supporting engagement with an associated brace 30, and consequently the second charge of feed 11 is dropped to the manger 22.

The above steps are repeated until the last charge of feed is deposited in the manger, at which time the loading process can be repeated and another operational cycle can be initiated.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An animal feed dispenser, comprising:

a cabinet;

a frame mounted to the cabinet and pivotally moveable with respect to the cabinet between a substantially horizontal feed loading position and a substantially upright operative position;

a feed support shelf mounted to the frame and movable with respect to the frame about a pivot axis between a feed support position and a feed discharge position; and a release member configured to operably engage and disengage the feed support shelf to respectively hold the feed support shelf in the feed support position and release the feed support shelf to move to the feed discharge position.

2. The animal feed dispenser of claim 1, wherein the feed support shelf is one of a plurality of feed support shelves mounted to the frame for pivotal movement between feed support positions and feed discharge positions; and wherein the release member is one of a plurality of release members that are positionable to engage and disengage the plurality of feed support shelves.

3. The animal feed dispenser of claim 1, wherein the feed support shelf includes a brace movable thereon between (a) a load bracing position in association with the feed support position of the feed support shelf and in which the brace extends between the feed support shelf and the release member to structurally support the feed support shelf in the feed support position, and (b) an unbraced free position in association with the feed discharge position in which the feed support shelf is unsupported by the brace.

4. The animal feed dispenser of claim 3, wherein the feed support shelf includes a brace movable thereon between (a) a load bracing position in association with the feed support position of the feed support shelf and in which the brace extends between the feed support shelf and the release member to structurally support the feed support shelf in the feed support position, and (b) an unbraced free position in association with the feed discharge position in which the feed support shelf is unsupported by the brace; and further comprising a channel on the frame, positioned to abut the brace member in the load bracing position.

5. The animal feed dispenser of claim 1 wherein the feed support shelf and release member are mounted to the frame and wherein the frame is mounted for movement about a hinge axis to the cabinet.

6. The animal feed dispenser of claim 1, wherein the release member is connected to a timed driver that is operable to shift the release member to disengage the feed support shelf.

7. The animal feed dispenser of claim 1, further comprising a motion damper mounted between the frame and the cabinet.

8. The animal feed dispenser of claim 1, wherein the frame is elongated and the feed support shelf is one of a plurality of feed support shelves spaced apart along the frame length and pivotal thereon about substantially parallel pivot axes arranged such that in the feed support positions, the feed support shelves are substantially horizontal and spaced apart elevationally, and such that in the feed discharge positions the feed support shelves are substantially vertical; and wherein each feed support shelf includes a brace pivotably movable thereon between (a) a load bracing position in which the brace holds the associated feed support shelf in the feed support position, and (b) an unbraced free position in which the feed support shelf is unsupported by the brace and is allowed to pivot to the feed discharge position.

9. An animal feed dispenser, comprising:

an upright cabinet having a feed discharge at a bottom end;

an upright array of shelves hinged within in the cabinet;

wherein each shelf can pivot within the cabinet from a substantially horizontal feed support position to a substantially vertical feed discharge position;

wherein each of the shelves includes a hinged brace that can swing from an operative bracing position, supporting the associated shelf in the feed support position, to a free position depending from the associated shelf in the feed discharge position;

a release member mounted below each shelf in the feed support position, and movable between an operative brace receiving position, to receive and support the brace of a shelf above, and a disengage position to disengage the brace to allow said shelf above to move to the feed discharge position; and wherein the shelves and release members are disposed in a spatial relationship such that each brace and associated shelf that are situated above a bottom most shelf in the feed support position, will rest against a shelf below, and as the shelf below moves to the feed discharge position, the brace of the shelf immediately above will engage and become supported on an adjacent one of the release members until said adjacent one of the release members moves to the disengage position.

10. The animal feed dispenser of claim 9, wherein the release members are mounted to a shaft and are spaced angularly about the shaft; and further comprising a driver configured to rotate the shaft and release members to sequentially engage and disengage the braces.

11. The animal feed dispenser of claim 9, wherein a driver is connected to the release members for moving the release members in succession to progressively disengage the braces such that the shelves move from the horizontal feed support positions to the feed discharge positions in a succession starting with a bottom most shelf and progressing to a top most shelf.

12. The animal feed dispenser of claim 9, wherein the shelves are mounted to a frame that is hinged to the cabinet and wherein the frame is moveable to lower the shelves to substantially horizontal feed loading positions.

13. The animal feed dispenser of claim 9, wherein the shelves are pivotably mounted about elevationally spaced and substantially parallel shelf axes, and wherein the release members are disposed elevationally below the respective parallel shelf axes.

14. The animal feed dispenser of claim 9, further comprising a frame mounting the shelves for movement to a substantially horizontal feed loading position, and further comprising a channel on the frame positioned to abut with the braces in the operative bracing positions.

15. The animal feed dispenser of claim 9, wherein the release members are mounted to a rotatable shaft and are spaced apart angularly from one another about the shaft by increments of approximately 180 degrees.

16. An animal feed dispenser, comprising:
a cabinet;
a frame mounted on the cabinet for pivotal movement between a substantially upright operative position and a substantially horizontal feed loading position;
a plurality of feed support shelves mounted on the frame about shelf pivot axes between feed support positions and feed discharge positions; and
wherein the feed support shelves are substantially horizontal in the feed support positions and pivotable to substantially vertical orientations in the feed release positions with the frame in the upright operative position;
wherein the feed support shelves are substantially horizontal in the feed release positions and are pivotable to substantially vertical orientations in the feed support positions with the frame in the substantially horizontal feed loading position; and
release members configured to operably engage and disengage the feed support shelves to release the feed support shelves to move to the feed discharge position.

* * * * *